US012719551B2

(12) United States Patent
Sim et al.

(10) Patent No.: US 12,719,551 B2
(45) Date of Patent: Aug. 25, 2026

(54) BEAM-BASED PRE-DISTORTION TRAINING

(71) Applicant: QUALCOMM Incorporated, San Diego, CA (US)

(72) Inventors: Min Soo Sim, San Diego, CA (US); Wei Zhao, San Diego, CA (US); Igor Gutman, Hod HaSharon (IL); Alexander Dorosenco, El Cajon, CA (US); Tao Luo, San Diego, CA (US); Damin Cao, San Diego, CA (US); Kyle Alexander Douglas, San Diego, CA (US); Carl Hardin, Encinitas, CA (US); Shrenik Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 18/672,840

(22) Filed: May 23, 2024

(65) Prior Publication Data

US 2025/0365054 A1 Nov. 27, 2025

(51) Int. Cl.

*H04B 7/06* (2006.01)
*H04B 17/12* (2015.01)
*H04B 17/21* (2015.01)

(52) U.S. Cl.

CPC ....... *H04B 7/06952* (2023.05); *H04B 7/0639* (2013.01); *H04B 17/12* (2015.01); *H04B 17/221* (2023.05)

(58) Field of Classification Search

CPC .. H04B 7/06952; H04B 7/0639; H04B 17/12; H04B 17/221

See application file for complete search history.

(56) References Cited

U.S. PATENT DOCUMENTS

2010/0311353 A1* 12/2010 Teillet ................ H01Q 15/0046 455/84
2019/0089389 A1* 3/2019 Gutman .................... H03F 3/24
2020/0119800 A1* 4/2020 Rune ................... H04W 72/046
2020/0145033 A1* 5/2020 Rafique ................. H03F 1/3247
2020/0367083 A1* 11/2020 Hao ..................... H04B 7/0469
2021/0083728 A1* 3/2021 Cheraghi ........... H04B 7/06952
2021/0234598 A1* 7/2021 Raghavan ............ H04B 7/0639
2022/0360283 A1* 11/2022 Gutman ............... H04B 7/0617

(Continued)

*Primary Examiner* — Jaison Joseph

(74) *Attorney, Agent, or Firm* — Dinsmore & Shohl LLP/Qualcomm

(57) ABSTRACT

Certain aspects of the present disclosure provide techniques for beam-based pre-distortion training. An example method of calibration of a wireless communications device includes obtaining a first configuration that indicates a first set of beams for communication of one or more first calibration signals between the wireless communications device and a receiver. The method further includes obtaining an indication of the one or more first calibration signals communicated between the wireless communications device and the receiver. The method further includes obtaining one or more first parameters for distortion calibration associated with communications via one or more beams of the wireless communications device based at least in part on the one or more first calibration signals. The method further includes sending a first signal based on the one or more first parameters.

20 Claims, 5 Drawing Sheets

(56) References Cited

U.S. PATENT DOCUMENTS

| | | | | |
|---|---|---|---|---|
| 2023/0223973 | A1* | 7/2023 | Gutman | H04B 7/0639<br>375/262 |
| 2024/0064727 | A1* | 2/2024 | Zhao | H04B 17/12 |
| 2025/0343647 | A1* | 11/2025 | Rahman | H04L 5/0053 |

* cited by examiner

BEAM-BASED PRE-DISTORTION TRAINING

INTRODUCTION

Field of the Disclosure

Aspects of the present disclosure relate to wireless communications, and more particularly, to pre-distortion training.

Description of Related Art

Wireless communications systems are widely deployed to provide various telecommunication services such as telephony, video, data, messaging, broadcasts, etc. These wireless communications systems may employ multiple-access technologies capable of supporting communications with multiple users by sharing available wireless communications system resources with those users. Wireless communication devices may communicate RF signals via any of various suitable radio access technologies (RATs) including, but not limited to, 5G New Radio (NR), Evolved Universal Terrestrial Radio Access (E-UTRA), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., Institute of Electrical and Electronics Engineers (IEEE) 802.11 specifications), any future RAT, and/or the like.

In certain cases, a wireless communications device is equipped with a radio frequency (RF) transceiver (also referred to as an RF front-end) for communicating RF signals. In general, a baseband signal is modulated to convey information using a modulation technique, such as phase-shift keying (PSK) or any other suitable modulation technique. In a transmit mode, the RF transceiver is responsible for multiplexing the baseband signal with an RF carrier signal that is transmitted over the air (e.g., a wireless communication channel). Such an operation is called upconversion. In a receive mode, the RF transceiver converts a received RF signal to the baseband signal. Such an operation is called downconversion. The received baseband signal then can be demodulated into the information encoded at a transmitter. The RF transceiver may include a cascade of components in a transmit chain and a receive chain, respectively. The cascade of components may include, for example, one or more of attenuators, switches, couplers, filters, mixers, amplifiers, frequency synthesizers, oscillators, antenna tuners, duplexers, diplexers, detectors, etc.

Although there have been great technological advancements in RF circuitry over many years, challenges still exist. For example, certain RF circuitry (such as amplifiers) can have non-linear characteristics that can distort a transmission. Accordingly, there is a continuous desire to improve the technical performance of RF circuitry, such as amplifiers via pre-distortion.

SUMMARY

Some aspects provide an apparatus configured for calibration of a wireless communications device. The apparatus includes one or more memories and one or more processors coupled to the one or more memories. The one or more processors are configured to cause the apparatus to obtain a first configuration that indicates a first set of beams for communication of one or more first calibration signals between the wireless communications device and a receiver; obtain an indication of the one or more first calibration signals communicated between the wireless communications device and the receiver; obtain one or more first parameters for distortion calibration associated with communications via one or more beams of the wireless communications device based at least in part on the one or more first calibration signals; and send a first signal based on the one or more first parameters.

Some aspects provide a method for calibration of a wireless communications device. The method includes obtaining a first configuration that indicates a first set of beams for communication of one or more first calibration signals between the wireless communications device and a receiver. The method further includes obtaining an indication of the one or more first calibration signals communicated between the wireless communications device and the receiver. The method further includes obtaining one or more first parameters for distortion calibration associated with communications via one or more beams of the wireless communications device based at least in part on the one or more first calibration signals. The method further includes sending a first signal based on the one or more first parameters.

Other aspects provide: an apparatus operable, configured, or otherwise adapted to perform any one or more of the aforementioned methods and/or those described elsewhere herein; a non-transitory, computer-readable medium comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Figure 1:
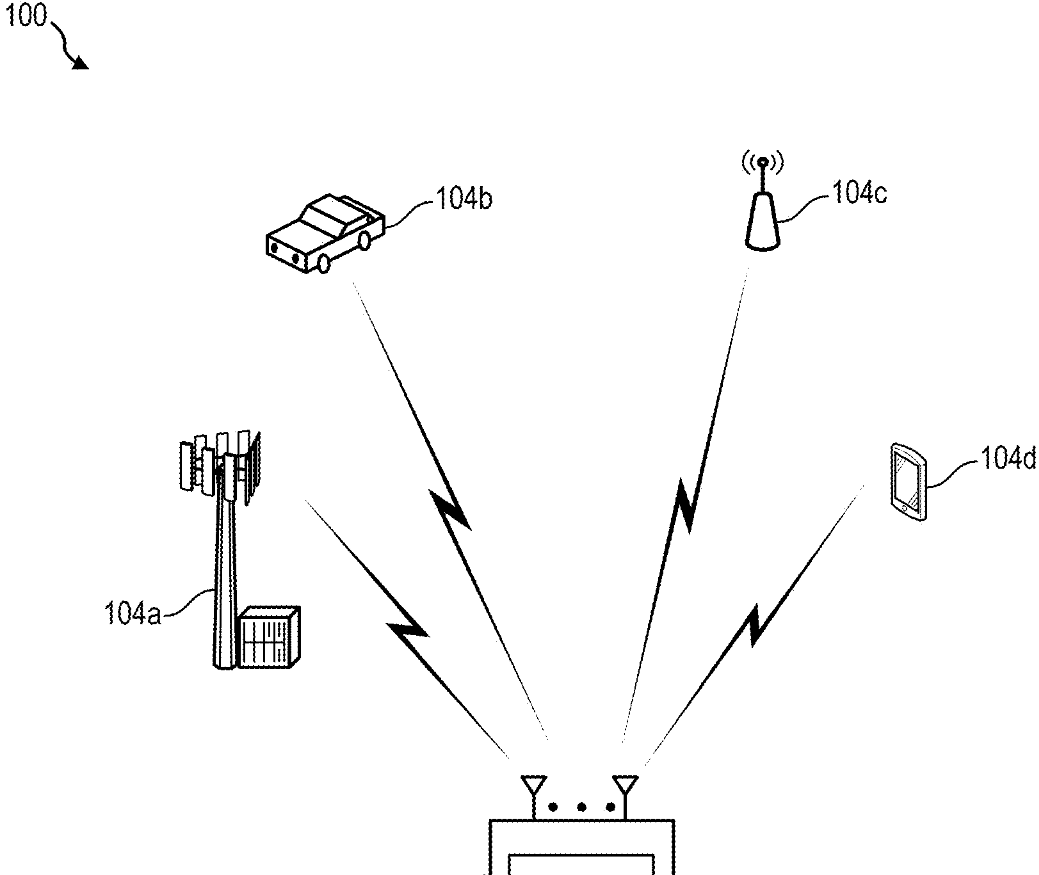
FIG. 1 depicts an example wireless communications system.

Aspects of the present disclosure provide apparatus, methods, processing systems, and computer-readable mediums for beam-based pre-distortion training.

A power amplifier (PA) in a radio frequency (RF) transmitter converts a low power signal to a high power signal for transmission via an antenna. In general, the PA consumes a large amount of electrical current to perform the high power conversion in a transceiver. The non-linearity of a PA may cause various signal distortions, such as gain compression, intermodulation distortion, amplitude-to-phase modulation (AM-PM) conversion, amplitude-to-amplitude modulation (AM-AM) conversion, spectral regrowth, etc. These non-linear effects can lead to adjacent channel interference, in-band distortion, block error rate degradation, and/or non-compliance with certain regulations on RF emissions (e.g., permissible adjacent channel emissions).

Pre-distortion is a technique used to compensate for non-linear effects of an amplifier, such as a PA. Pre-distortion (e.g., phase and/or amplitude corrections) can be applied to an input signal to the PA in order to cancel or compensate for the non-linear effects and improve the linearity of the output of the PA. Linearizing the PA output via pre-distortion can enable efficiencies in terms of power consumption and reducing chip heat. Digital pre-distortion (DPD) is the process of applying a pre-distortion in a digital domain. DPD provides a cost effective method of applying the pre-distortion to a communications signal. Accordingly, pre-distortion can enable certain power efficiencies by allowing a PA to be operated in a non-linear region of the PA gain response (e.g., at gain compression or saturation point). The non-linear region may refer to when the PA is operating at a level of amplification where the PA is amplifying a signal non-linearly.

Technical problems for pre-distortion include, for example, capturing suitable feedback to characterize the non-linearity of the PA for pre-distortion training. During pre-distortion training (e.g., at a device calibration phase and/or online training phase), the non-linear effects of a PA are characterized by feeding a training signal to the PA as input and comparing the corresponding output signal of the PA to the training signal. The non-linearity of the PA may introduce certain gain and/or phase errors into the training signal as indicated in the output signal. Pre-distortion aims to compensate for the non-linear effects of the PA by altering the input signal fed to the PA such that the non-linear distortions of the PA are effectively canceled from the output signal of the PA.

In certain cases, a device may wirelessly communicate via beamforming. For transmit beamforming, a transmitter may adjust the amplitude and phase of a signal fed to an array of antenna elements to shape and direct the radiation pattern output by the transmitter. Each of the antenna elements may be coupled to a separate power amplifier and a phase shifter in order to adjust the amplitude and phase of a signal fed to the respective antenna element for transmit beamforming. In the case of millimeter wave (mmWave) communications (e.g., in a frequency band between 24 GHz and 300 GHz), a transmitter may have a relatively large antenna array, for example, including a total of 64, 128, 256 or more antenna elements. For different beams, the transmitter may exhibit different non-linear characteristics, for example, due to the different combinations of amplitudes being applied to the power amplifiers across the antenna array. Accordingly, feedback that characterizes the non-linearity of an individual power amplifier may not take into account or consider a combination of non-linear effects encountered while using multiple power amplifiers for transmit beamforming, especially for mmWave communications.

Aspects described herein overcome the aforementioned technical problem(s), for example, by providing beam-based pre-distortion training that may enable compensation of the non-linear effects associated with transmit beamforming. In certain aspects, a wireless communications device may transmit a calibration signal via a set of beams; and an external receiver may be used to characterize the far-field non-linear effects associated with the set of beams. For example, the receiver may obtain the calibration signal associated with a particular beam, and pre-distortion coefficient(s) may be determined for the beam based on the calibration signal. In certain cases, the wireless communications device may output a calibration signal via a single beam for pre-distortion training, and pre-distortion coefficient(s) derived from the calibration signal may be applied to one or more beams. In certain cases, the wireless communications device may output a calibration signal via multiple beams, for example, through beam sweeping; and pre-distortion coefficient(s) may be applied to a specific beam or multiple beams.

Certain aspects of the techniques for beam-based pre-distortion training as described herein may provide various beneficial technical effects and/or advantages. In certain aspects, the techniques for beam-based pre-distortion training may enable improved wireless communication performance, such as reduced error vector magnitude and/or improved signal quality. In certain aspects, the improved wireless communication performance may be attributable to the beam-based pre-distortion training described herein that allows beam specific distortion compensation to be applied to transmissions via one or more beams. In some examples, the beam-specific distortion compensation may provide about 1 dB gain improvement in terms of error vector magnitude.

The term "beam" may be used in the present disclosure in various contexts. Beam may be used to mean a set of gains and/or phases (e.g., precoding weights or co-phasing weights) applied to antenna elements in (or associated with) a wireless communication device for transmission or reception. The term "beam" may also refer to an antenna or radiation pattern of a signal transmitted while applying the gains and/or phases to the antenna elements. Other references to beam may include one or more properties or parameters associated with the antenna (or radiation) pattern, such as an angle of arrival (AoA), an angle of departure (AoD), a gain, a phase, a directivity, a beam width, a beam direction (with respect to a plane of reference) in terms of azimuth and/or elevation, a peak-to-side-lobe ratio, and/or an antenna (or precoding) port associated with the antenna (radiation) pattern. The term "beam" may also refer to an associated number and/or configuration of antenna elements (e.g., a uniform linear array, a uniform rectangular array, or other uniform array).

Example Wireless Communications System

FIG. 1 illustrates an example wireless communications system 100 in which aspects of the present disclosure may be performed. For example, the wireless communications system 100 may include a wireless wide area network (WWAN) and/or a wireless local area network (WLAN). A WWAN may include a New Radio (NR) system (e.g., a Fifth Generation (5G) NR network), an Evolved Universal Terrestrial Radio Access (E-UTRA) system (e.g., a Fourth Generation (4G) network), a Universal Mobile Telecommunications System (UMTS) (e.g., a Second Generation (2G) or Third Generation (3G) network), a code division multiple access (CDMA) system (e.g., a 2G/3G network), any future WWAN system, or any combination thereof. A WLAN may include a wireless network configured for communications according to an Institute of Electrical and Electronics Engineers (IEEE) standard such as one or more of the 802.11 standards, etc. In some cases, the wireless communications system 100 may include a device-to-device (D2D) communications network or a short-range communications system, such as Bluetooth communications or near field communications (NFC).

As illustrated in FIG. 1, the wireless communications system 100 may include a first wireless device 102 communicating with any of various second wireless devices 104*a-d* (hereinafter "the second wireless device 104") via any of various radio access technologies (RATs), where a wireless device may refer to a wireless communications device. The RATs may include, for example, WWAN communications (e.g., E-UTRA and/or 5G NR), WLAN communications (e.g., IEEE 802.11), vehicle-to-everything (V2X) communications, non-terrestrial network (NTN) communications, short-range communications (e.g., Bluetooth), etc.

The first wireless device 102 may include any of various wireless communications devices including a user equipment (UE), a base station, a wireless station, an access point, customer-premises equipment (CPE), etc. In certain aspects, the first wireless device 102 includes distortion manager 106 that performs beam-based pre-distortion training and/or compensation, in accordance with aspects of the present disclosure.

The second wireless device 104 may include, for example, a base station 104*a*, a vehicle 104*b*, an access point (AP) 104*c*, and/or a UE 104*d*. Further, the wireless communications systems 100 may include terrestrial aspects, such as ground-based network entities (e.g., the base station 104*a* and/or access point 104*c*), and/or non-terrestrial aspects, such as a spaceborne platform and/or an aerial platform, which may include network entities on-board (e.g., one or more base stations) capable of communicating with other network elements (e.g., terrestrial base stations) and/or user equipment.

The base station 104*a* may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. The base station 104*a* may provide communications coverage for a respective geographic coverage area, which may sometimes be referred to as a cell, and which may overlap in some cases (e.g., a small cell may have a coverage area that overlaps the coverage area of a macro cell). A base station may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

The first wireless device 102 and/or the UE 104*d* may generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. A UE may also be referred to more generally as a mobile device, a wireless device, a wireless communications device, a wireless station (STA), a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and other terms.

Figure 2:
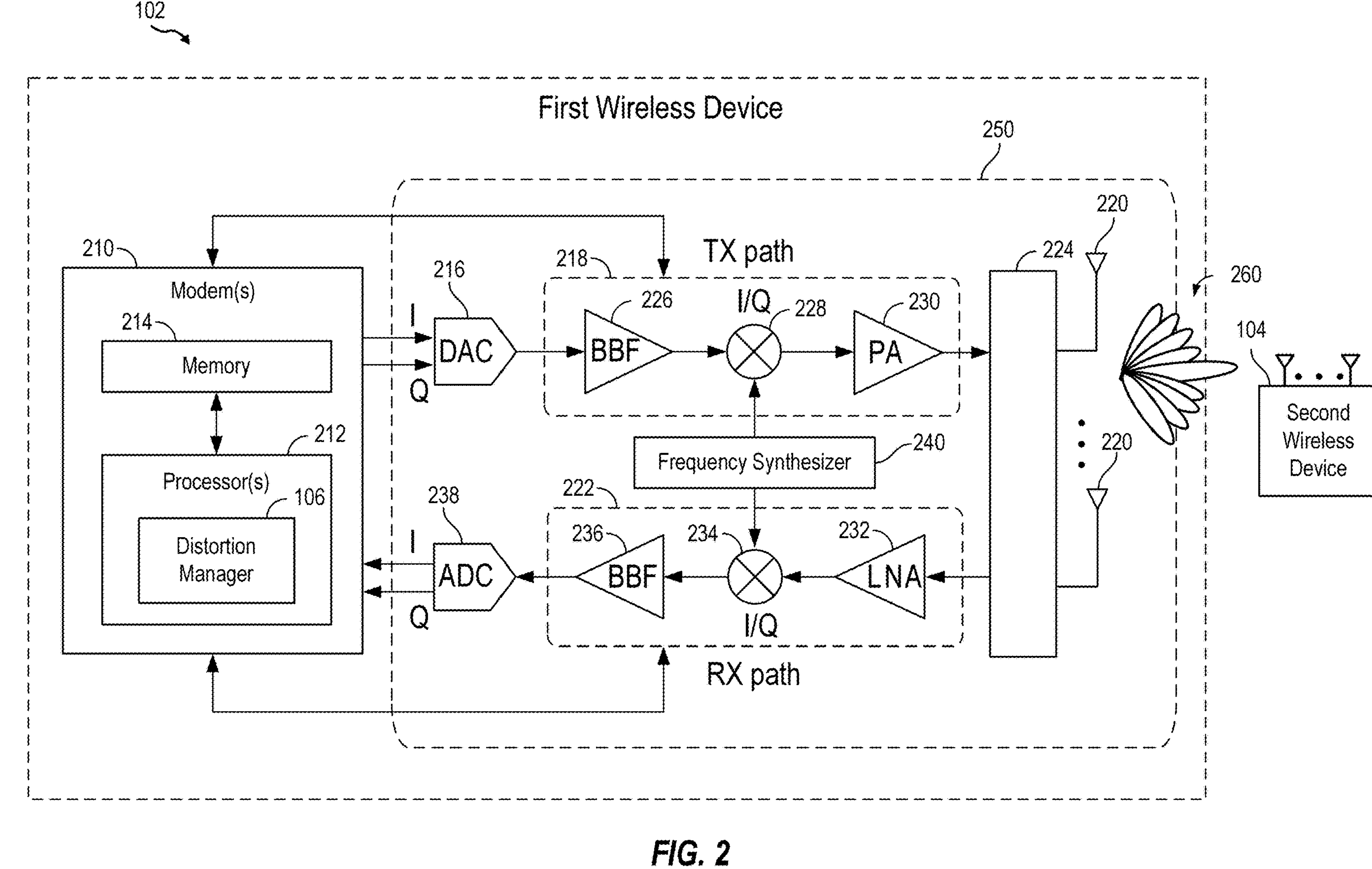
FIG. 2 depicts an example wireless communications device communicating with another device.

FIG. 2 illustrates example components of the first wireless device 102, which may be used to communicate with any of the second wireless devices 104.

The first wireless device 102 may be, or may include, a chip, system on chip (SoC), system in package (SiP), chipset, package, device that includes one or more modems 210 (hereinafter "the modem 210"). In some cases, the modem 210 may include, for example, any of a WWAN modem (e.g., a modem configured to communicate via E-UTRA 5G NR, and/or any future WWAN communications standards), a WLAN modem (e.g., a modem configured to communicate via IEEE 802.11 standards), a Bluetooth modem, a NTN modem, etc. In certain aspects, the first wireless device 102 also includes one or more RF transceivers (hereinafter "the RF transceiver 250"). In some cases, the RF transceiver 250 may be referred to as an RF front end (RFFE). In some aspects, the modem 210 further includes one or more processors, processing blocks or processing elements (hereinafter "the processor 212") and one or more memory blocks or elements (hereinafter "the memory 214"). In some cases, the processor 212 may implement and/or include the distortion manager 106 of FIG. 1. In certain aspects, the processor 212 and/or the memory 214 are implemented external or otherwise separate from the modem 210.

In certain aspects, the processor 212 may process any of certain protocol stack layers associated with a radio access technology (RAT). For example, the processor 212 may process any of an application layer, packet layer, WLAN protocol stack layers (e.g., a link or a medium access control (MAC) layer), and/or WWAN protocol stack layers (e.g., a radio resource control (RRC) layer, a packet data convergence protocol (PDCP) layer, a radio link control (RLC) layer, and a MAC layer).

The modem 210 may generally be configured to implement a physical (PHY) layer. For example, the modem 210 may be configured to modulate packets and to output the modulated packets to the RF transceiver 250 for transmission over a wireless medium. The modem 210 is similarly configured to obtain modulated packets received by the RF transceiver 250 and to demodulate the packets to provide demodulated packets. In addition to a modulator and a demodulator, the modem 210 may further include digital signal processing (DSP) circuitry, automatic gain control (AGC), a coder, a decoder, a multiplexer, and/or a demultiplexer (not shown).

As an example, while in a transmission mode, the modem 210 may obtain data from a data source, such as an application processor. The data may be provided to a coder, which encodes the data to provide encoded bits. The encoded bits may be mapped to points in a modulation constellation (e.g., using a selected modulation and coding scheme) to provide modulated symbols. The modulated symbols may be mapped, for example, to spatial stream(s) or space-time streams. The modulated symbols may be multiplexed, transformed via an inverse fast Fourier transform (IFFT) block, and subsequently provided to DSP circuitry for transmit windowing and filtering. The digital signals may be provided to a digital-to-analog converter (DAC) 216. In certain aspects involving beamforming, the modulated symbols in the respective spatial streams may be precoded via a steering matrix prior to provision to the IFFT block.

The modem 210 may be coupled to the RF transceiver 250 by a transmit (TX) path 218 (also known as a transmit chain) for transmitting signals via one or more antennas 220 (hereinafter "the antennas 220") and a receive (RX) path 222 (also known as a receive chain) for receiving signals via the antennas 220. When the TX path 218 and the RX path 222 share the antennas 220, the paths may be coupled to the antennas 220 via an interface 224, which may include any of various suitable RF devices, such as one or more phase shifters (for beamforming), a balun, a transformer, an antenna tuner, a switch, a duplexer, a diplexer, a multiplexer, and the like. As an example, the modem 210 may output digital in-phase (I) and/or quadrature (Q) baseband signals representative of the respective symbols to the DAC 216. In some examples, all or most of the elements illustrated as being included in the RF transceiver 250 are implemented in a single chip or die. For example, in some configurations, all of the elements of the RF transceiver except the antennas 220 are implemented on a single chip. In some other configurations, the interface 224 or a portion thereof is also omitted from the single chip.

Receiving I or Q baseband analog signals from the DAC 216, the TX path 218 may include a baseband filter (BBF) 226, a mixer 228 (which may include one or several mixers), and a power amplifier (PA) 230. The BBF 226 filters the baseband signals received from the DAC 216, and the mixer 227 mixes the filtered baseband signals with a transmit local oscillator (LO) signal to convert the baseband signal to a different frequency (e.g., upconvert from baseband to a radio frequency). In some aspects, the frequency conversion process produces the sum and difference frequencies between the LO frequency and the frequencies of the baseband signal. The sum and difference frequencies are referred to as the beat frequencies. Some beat frequencies are in the RF range, such that the signals output by the mixer 228 are typically RF signals, which may be amplified by the PA 230 before transmission by the antennas 220. The antennas 220 may emit RF signals, which may be received at the second wireless device 104. In certain aspects, the antennas 220 may be capable of forming one or more beams 260. While one mixer 228 is illustrated, several mixers may be used to upconvert the filtered baseband signals to one or more intermediate frequencies and to thereafter upconvert the intermediate frequency signals to a frequency for transmission.

The RX path 222 may include a low noise amplifier (LNA) 232, a mixer 234 (which may include one or several mixers), and a baseband filter (BBF) 236. RF signals received via the antennas 220 (e.g., from the second wireless device 104) may be amplified by the LNA 232, and the mixer 234 mixes the amplified RF signals with a receive local oscillator (LO) signal to convert the RF signal to a baseband frequency (e.g., downconvert). The baseband signals output by the mixer 234 may be filtered by the BBF 236 before being converted by an analog-to-digital converter (ADC) 238 to digital I or Q signals for digital signal processing. The modem 210 may receive the digital I or Q signals and further process the digital signals, for example, demodulating the digital signals into information.

Certain transceivers may employ frequency synthesizers with a voltage-controlled oscillator (VCO) to generate a stable, tunable LO frequency with a particular tuning range. Thus, the transmit LO frequency may be produced by a frequency synthesizer 240, which may be buffered or amplified by an amplifier (not shown) before being mixed with the baseband signals in the mixer 228. Similarly, the receive LO frequency may be produced by the frequency synthesizer 240, which may be buffered or amplified by an amplifier (not shown) before being mixed with the RF signals in the mixer 234. Separate frequency synthesizers may be used for the TX path 218 and the RX path 222.

While in a reception mode, the modem 210 may obtain digitally converted signals via the ADC 238 and RX path 222. As an example, in the modem 210, digital signals may be provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also may be coupled with the demodulator, which is configured to extract modulated symbols from the signal and, for example, compute the logarithm likelihood ratios (LLRs) for each bit position of each subcarrier in each spatial stream. The demodulator may be coupled with the decoder, which may be configured to process the LLRs to provide decoded bits. The decoded bits from all of the spatial streams may be fed to the demultiplexer for demultiplexing. The demultiplexed bits may be descrambled and provided to a medium access control layer (e.g., the processor 212) for processing, evaluation, or interpretation.

The modem 210 and/or processor 212 may control the transmission of signals via the TX path 218 and/or reception of signals via the RX path 222. In some aspects, the modem 210 and/or processor 212 may be configured to perform various operations, such as those associated with any of the methods described herein. The modem 210 and/or processor 212 may include a microcontroller, a microprocessor, an application processor, a baseband processor, a MAC processor, an artificial intelligence (AI) processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 214 may store data and program codes (e.g., processor-readable instructions) for performing wireless communications as described herein. In some cases, the memory 214 may be external to the modem 210 and/or processor 212 and/or incorporated therein (as illustrated with the memory 214 or being incorporated with the processor 212).

FIG. 2 shows an example transceiver design. It will be appreciated that other transceiver designs or architectures may be applied in connection with aspects of the present disclosure. For example, while examples discussed herein utilize I and Q signals (e.g., quadrature modulation), those of skill in the art will understand that components of the transceiver may be configured to utilize any other suitable modulation, such as polar modulation. As another example, circuit blocks may be arranged differently from the configuration shown in FIG. 2, and/or other circuit blocks not shown in FIG. 2 may be implemented in addition to or instead of the blocks depicted.

Example Beam-Based Pre-Distortion Training

Aspects of the present disclosure provide apparatus and methods for beam-based pre-distortion training that may enable beam-specific distortion compensation. In certain aspects, the beam-based pre-distortion training may enable reduced error vector magnitudes for one or more transmit beams, as further described herein.

Figure 3:
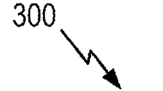
FIG. 3 depicts an example system for beam-based pre-distortion training.
Figure 3:
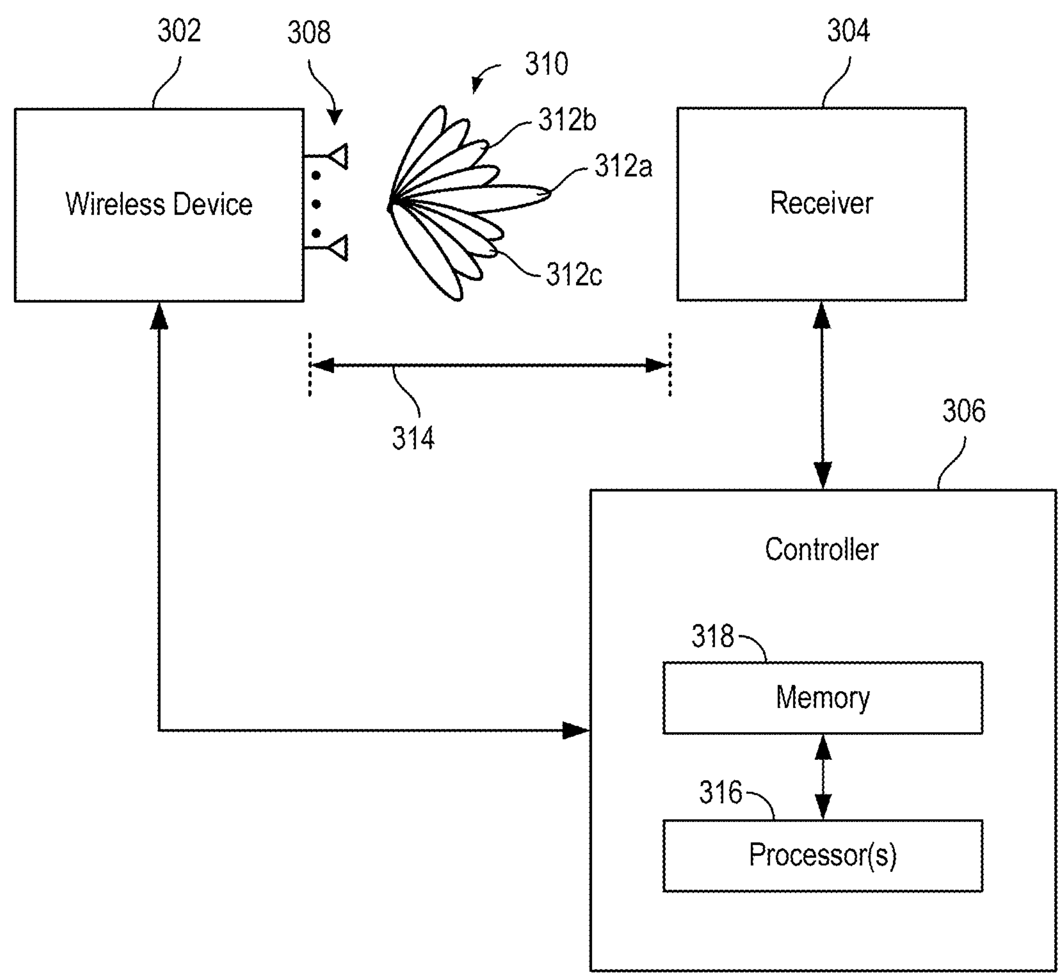

FIG. 3 depicts an example system 300 for beam-based pre-distortion training. In this example, the system 300 may include a wireless communications device (hereinafter "the wireless device 302"), a receiver 304, and a controller 306.

The wireless device 302 may be an example of the first wireless device 102 of FIGS. 1 and 2. As an example, the wireless device 302 may include one or more transmit chains, such as the TX path 218 of FIG. 2. In certain cases, the wireless device 302 may be or include a user equipment (UE), a base station, an access point, a radio unit (or remote radio head), and/or a transmission-reception point for a wireless communications system. The wireless device 302 may include one or more antenna arrays 308 having a plurality of antennas used for beamforming. In certain cases, an example antenna array of the antenna array(s) 308 may include a total of 64, 128, 256 or more antenna elements. As an example, the wireless device 302 may be capable of forming one or more beams 310 (e.g., the beams(s) 260 of FIG. 2) via the antenna array(s) 308 for wireless communications. The beam(s) 310 may include, for example, a first beam 312*a*, a second beam 312*b*, and a third beam 312*c*. As an example, in order to form the first beam 312*a*, the wireless device may apply a first combination of amplitudes and/or phase shifts across the antenna array(s) 308 via a set of amplifiers (e.g., the PA 230) and/or a set of phase shifters of the transmit path(s). In order to form the second beam, the wireless device 302 may apply a second combination of amplitudes and/or phase shifts across the antenna array(s) 308 via the set of amplifiers and/or the set of phase shifters. Accordingly, the non-linear characteristics associated with the first beam 312*a* exhibited by the wireless device 302 may be different from the non-linear characteristics associated with the second beam 312*b* exhibited by the wireless device, for example, due to the differing amplitude combinations and/or phase shift combinations.

In certain aspects, the wireless device 302 may be configured to communicate via mmWave bands, such as Frequency Range 2 (FR2) for 5G NR systems. The 3$^{rd}$ Generation Partnership Project (3GPP) currently defines FR2 as including 24,250 MHz-71,000 MHz, which is sometimes referred to (interchangeably) as a "millimeter wave" ("mmW" or "mmWave").

The receiver 304 may be or include one or more antennas coupled to one or more receive chains, for example, as described herein with respect to FIG. 2. The receiver 304 may satisfy certain performance specifications, such as signal quality threshold(s). As an example, one or more metrics associated with the calibration signal(s) obtained at the receiver 304 may satisfy one or more thresholds. The threshold(s) may include a signal-to-noise ratio (SNR) threshold, an integrated phase noise threshold, a residual sideband power threshold, an adjacent channel leakage threshold, and/or the like. The receiver 304 may be in communication with the controller, for example, via a wired or wireless communications link. During pre-distortion training for the wireless device 302, the receiver 304 may obtain one or more training or calibration signals from the wireless device 302. The calibration signal(s) obtained at the receiver 304 may be referred to as feedback signal(s). The receiver 304 may provide an indication of the feedback signal(s) to the controller 306. The indication of the feedback signal(s) may be or include a digital representation of the time-domain waveform of the feedback signal(s). In certain cases, the indication of the feedback signal(s) may be or include a gain error or phase error associated with the feedback signal(s). The indication of the feedback signal(s) may be or include one or more properties associated with the feedback signal(s), such as an error vector magnitude (EVM), a signal-to-noise ratio (SNR), a signal-to-interference plus noise ratio (SINR), a signal-to-noise-plus-distortion ratio (SNDR), a received signal strength indicator (RSSI), a reference signal received power (RSRP), a reference signal received quality (RSRQ), and/or a block error rate (BLER). In certain cases, the receiver 304 may send, to the controller 306, an indication of the training beam(s) that is associated with the feedback signal(s). For example, the receiver 304 may send an indication of a beam index associated with the training beam. In certain cases, the receiver may send an indication of an occasion corresponding to the time period in which feedback signal(s) are received at the receiver 304.

The signal obtained at the receiver 304 may be referred to as the feedback signal, which may correspond to the calibration signal. In certain aspects, the receiver 304 may be external to the wireless device 302, such that the receiver 304 may be arranged to be separated from the wireless device by a certain distance (or spacing) 314. The external arrangement of the receiver 304 relative to the wireless device 302 may enable characterization of (far-field) non-linear effects associated with at least one of the beam(s) 310 used by the wireless device 302 for communications, as further described herein.

The controller 306 may be or include one or more processors (hereinafter "the processor 316") coupled to one or more memories (hereinafter "the memory 318"). The processor 316 may be or include a microcontroller, a microprocessor, an application processor, a baseband processor, a MAC processor, an AI processor, a DSP, an ASIC, a FPGA or other PLD, discrete gate or transistor logic, discrete hardware components, or any combination thereof. The memory 318 may store data and/or program code(s) (e.g., processor-readable instruction(s)) for performing the beam-based distortion training as described herein. In some cases, the memory 318 may be external to the processor 316 and/or incorporated therein. The controller 306 may be in communication with the wireless device 302 and the receiver 304, for example, via a wired or wireless communications link. In certain aspects, the receiver 304 may be integrated with the controller 306. In certain aspects, the controller 306 may be integrated with the wireless device 302, such that the wireless device 302 performs the beam-based pre-distortion training described herein. For example, the processor 316 may be an example of the modem 210 and/or the processor 212 of FIG. 2. The memory 318 may be an example of the memory 214 of FIG. 2.

The controller 306 may manage the beam-based pre-distortion training of the wireless device 302. The controller 306 may be configured to determine a calibration configuration for the wireless device 302 and provide the calibration configuration to the wireless device 302. The calibration configuration may indicate a set of beams for communication of calibration or training signal(s) between the wireless device 302 and the receiver 304 to characterize non-linear effects associated with one or more transmit beams (e.g., the beam(s) 310) of the wireless device 302. For example, the calibration configuration may indicate the set of beams through a list of one or more beam indexes associated with the set of beams. In certain aspects, the calibration configuration may indicate the set of beams though parameters that define how to form a beam, such as a set of gains and/or phases. In certain cases, the set of beams of the calibration configuration may include at least one beam of the beam(s) 310, such as the first beam 312*a*. In certain cases, the set of beams of the calibration configuration may include multiple beams of the beam(s) 310, such as the first beam 312*a*, the second beam 312*b*, and/or the third beam 312*c*. In certain cases, the set of beam may include all of the beam(s) 310.

In certain aspects, the calibration configuration may indicate or include a beam sweeping pattern over time across the set of beams for communication of the calibration signal(s). The calibration configuration may indicate the beam sweeping pattern through a sequence of beam indexes. For example, the calibration configuration may indicate for the wireless device to transmit a first calibration signal via the first beam 312*a* at a first occasion (e.g., a first time period), and then to transmit a second calibration signal via the second beam 312*b* at a second occasion (e.g., a second time period) that occurs after the first occasion and does not overlap in time with the first occasion. The calibration configuration may indicate a set of occasions in which to sweep through the set of beams such that a single beam is used per occasion to transmit a calibration signal. In certain aspects, the beam sweeping pattern may allow the receiver 304 and/or the controller 306 to know which calibration signal is sent via which beam at which time or occasion of the beam sweeping pattern, and therefore, the beam sweeping pattern may provide an association between a training beam and a calibration signal and/or feedback signal.

The controller 306 may obtain an indication of the calibration signal(s) received at the receiver 304. The indication of the calibration signal(s) may be or include a digital representation of the time-domain waveform of the calibration signal(s). In certain cases, the indication of the calibration signal(s) may be or include a gain error or phase error associated with the calibration signal(s). The indication of the calibration signal(s) may be or include one or more properties associated with the calibration signal(s), such as an EVM, an SNR, an SINR, an SNDR, an RSSI, an RSRP, an RSRQ, and/or a BLER.

The controller 306 may determine one or more parameters for distortion calibration associated with communications via the beam(s) 310 based on the calibration signal(s). The parameter(s) may be or include coefficient(s) of a model that represents the non-linear system associated with a transmit path used for beamforming. As an example, the parameter(s) may be or include pre-distortion coefficients, such as memory-polynomial coefficients of a generalized polynomial model for DPD or the like. In certain cases, the one or more parameters may be specific to a single beam of the beam(s), such as the first beam 312*a*. In certain cases, the same parameter(s) may be applied to a set of beams including a subset of the beam(s) 310 or all of the beam(s) 310. The beam-based pre-distortion training via the first beam 312*a* may be applied to set of beams, for example, including the second beam 312*b* or the third beam 312*c*. In certain cases, the beam used for distortion training (e.g., the training beam) may be different from the beam used for communications (e.g., the transmit beam). The controller 306 may assume that the training beam and the transmit beam may exhibit the same or similar non-linear distortions. For example, the controller 306 may determine pre-distortion coefficients for the second beam 312*b* based on a transmission of a calibration signal via the first beam 312*a*, or vice versa. Such a technique of applying calibration parameter(s) to a different beam from the training beam may reduce the time, power consumption, and processing resources used to determine the parameter(s). The one or more parameters may include one or more first pre-distortion coefficients associated with communications via the first beam of the beam(s). The one or more parameters may include one or more second pre-distortion coefficients associated with communications via the second beam of the beam(s). The one or more parameters may include one or more third pre-distortion coefficients associated with communications via a plurality of beams of the beam(s).

During pre-distortion training, DAC(s) (such as the DAC 216) of the wireless device 302 may output a specific calibration signal (e.g., based on an input from processor 212, the modem 210, and/or distortion manager 106) used to characterize the distortion or non-linearity associated with a set of beams, such as the first beam 312*a*, associated with the calibration configuration. In certain aspects, one or more other components (e.g., the mixer 228) may be used in addition to or instead of the DAC to output a calibration signal (e.g., based on an input from the processor 212, the modem 210, and/or distortion manager 106).

As an example, the wireless device 302 may output a calibration signal via the first beam 312*a* using a combination of amplitudes applied to a set of amplifiers (e.g., the PA 230) and/or a combination of phase shifts applied to a set of phase shifters, where the set of amplifiers and the set of phase shifters may be coupled to the antenna array 308. A feedback signal based on the calibration signal is obtained at the receiver 304. In particular, the feedback signal may be the calibration signal as received at the receiver 304 (e.g., after any channel response due to propagation of the calibration signal between the wireless device 302 and receiver 304). The feedback signal may be representative of the (far-field) non-linear effects of the beamforming associated with the first beam 312*a*. The feedback signal may be or include the signal received at the receiver 304 corresponding to the calibration signal output at the wireless device 302 via the first beam 312*a*. The calibration signal may encounter signal propagation effects between the wireless device 302 and receiver 304, resulting in the feedback signal at the receiver 304. The receiver 304 may convert the feedback signal in a digital domain for digital signal processing on the feedback signal to characterize the distortion associated with the first beam 312*a*. The receiver 304 may send an indication of the feedback signal to the controller 306. The feedback signal may be used to characterize the non-linear effects associated with the first beam 312*a*.

The controller 306 may determine one or more parameters for distortion calibration (e.g., DPD) associated with the first beam 312*a* based at least in part on the feedback signal. In a digital domain (for example), the controller 306 (e.g., using the distortion manager 106 of FIGS. 1 and 2) may compare a feedback signal to a calibration signal to characterize the non-linearity of a PA (or a set of PAs) and determine pre-distortion coefficients for DPD. The controller 306 may compare the feedback signal to the calibration signal fed through the set of amplifiers and/or the set of phase shifters of the wireless device 302, for example, in order to determine amplitude correction(s) and/or phase correction(s) to compensate for the non-linear effects associated with a beam. The controller 306 may determine pre-distortion coefficients of an inverse model of the PA (or the set of PAs) that can be used to effectively cancel certain non-linear effects of the PA (or the set of PAs) via pre-distortion. The controller 306 may pre-calculate the inverse model across a range of possible inputs and store the results in a look-up-table. In certain cases, the look-up-table may indicate amplitude correction(s) and/or phase correction(s) to apply to a signal in the digital domain at the wireless device 302. In certain cases, the look-up-table may provide certain operating parameter(s) for one or more components (e.g., a frequency synthesizer and/or PA) of a TX path (e.g., the TX path 218) to perform phase and/or amplitude corrections for the pre-distortion. In certain aspects, the model used as the inverse model of the PA may be or include a Volterra series model, a memory polynomial (MP) model, and/or a generalized memory polynomial (GMP) model. During transmission mode, the wireless device 302 (e.g., through the modem 210 and/or the processor 212) may apply the DPD to a transmit signal in the digital domain and feed the pre-distorted transmit signal to the TX path 218 via the DAC 216. The DPD may effectively cancel (or compensate for) the non-linear effects of the PA 230.

In certain aspects, the parameter(s) may be or include a gain error and/or phase error associated with the feedback signal relative to the calibration signal. The parameter(s) may be or include pre-distortion coefficients (e.g., memory-polynomial coefficients of a generalized polynomial model for DPD), an amplitude-to-phase modulation (AM-PM) conversion associated with the set of amplifiers, and/or an amplitude-to-amplitude modulation (AM-AM) conversion associated with the set of amplifiers. Accordingly, the beam-based pre-distortion training may enable reduced error vector magnitude(s) and/or improved signal quality for beam-formed transmissions at the wireless device 302, for example, due to beam specific distortion compensation being applied to transmissions via one or more beams.

In certain aspects, the controller 306 may evaluate the performance of the parameter(s) for distortion calibration in order to determine whether to perform subsequent beam-based pre-distortion training using a different training beam. For example, when the performance of a transmit beam does not satisfy a threshold, the controller 306 may notify the wireless device 302 to perform a beam-based pre-distortion training using the transmit beam as the training beam. When the training beam is different from the transmit beam used for communications, the controller 306 may evaluate the performance of communications via the transmit beam using pre-distortion coefficient(s) determined based on the training beam. As an example, when the performance of communications via the second beam 312*b* using parameter(s) determined based on the first beam 312*a* does not satisfy a threshold (e.g., when the error vector magnitude associated with the second beam 312*b* is greater than or equal to the threshold), the controller 306 may send, to the wireless device 302, a calibration configuration to use at least the second beam 312*b* as the training beam. Then, the controller 306 may determine calibration parameter(s) for communications via the second beam 312*b* based on the feedback signal obtained at the receiver 304.

Figure 4:
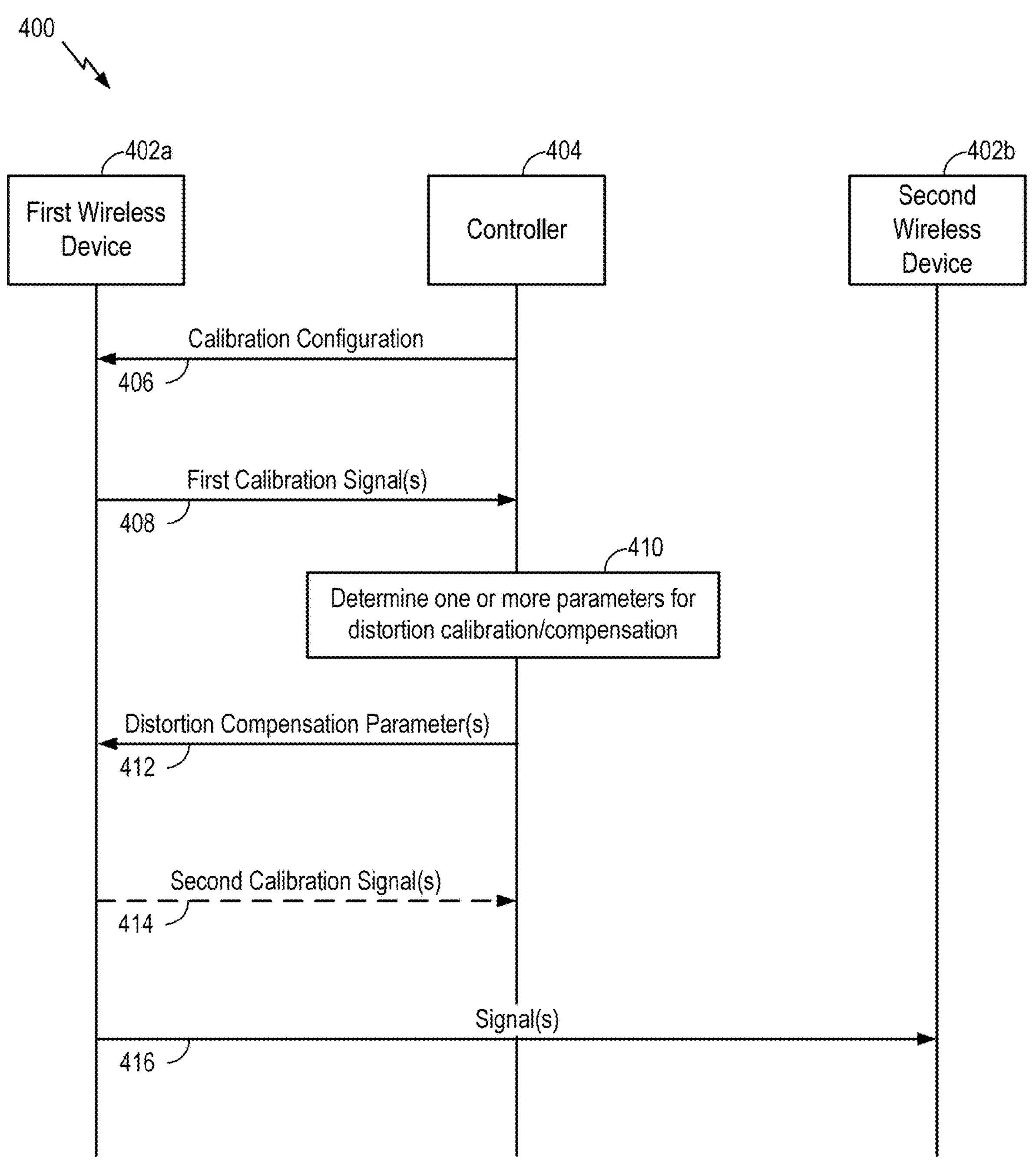
FIG. 4 depicts an example process flow for signaling for beam based pre-distortion training.

FIG. 4 depicts an example process flow 400 for signaling for beam based pre-distortion training. In certain aspect, the first wireless device 402*a* may be an example of the wireless device 302 of FIG. 3 and/or the first wireless device 102 of FIGS. 1 and 2. In certain aspects, the second wireless device 402*b* may be an example of the second wireless device 104 of FIGS. 1 and 2. In certain aspects, the controller 404 may be an example of the receiver 304 integrated with the controller 306 of FIG. 3. Note that any operations or signaling illustrated with dashed lines may indicate that that operation or signaling is an optional or alternative example.

At 406, the first wireless device 402*a* obtains, from the controller 404, a calibration configuration that indicates a first set of beams (e.g., the first beam 312*a*) for communication of one or more first calibration signals between the first wireless device 402*a* and a receiver (e.g., the receiver 304 of FIG. 3). The calibration configuration may indicate the training beam(s) to use for beam-based pre-distortion training.

At 408, the first wireless device 402*a* sends, to the controller 404, the one or more first calibration signals via the set of beams. As an example, the first wireless device 402*a* may send a first calibration signal via the first beam 312*a* of FIG. 3. The controller 404 may obtain an indication of the first calibration signal, for example, via the receiver 304 of FIG. 3. Note that, in certain cases, a receiver may be external to the controller 404, such that the receiver obtains calibration signal(s) from the first wireless device 402*a* and provides, to the controller 404, an indication of the calibration signal(s).

At 410, the controller 404 determines one or more parameters for distortion calibration or compensation for communications via one or more beams (e.g., the beam(s) 310) based at least in part on the first calibration signal. As an example, the controller 404 may determine pre-distortion coefficient(s) for DPD associated with communications via the one or more beams.

At 412, the first wireless device 402*a* obtain, from the controller 404, an indication of the parameter(s) for distortion calibration or compensation. In certain aspects, the parameter(s) may be specific to communications via a single beam or multiple beams. In certain aspects, the parameter(s) may be applied to a transmit beam different from the training beam used to determine the parameter(s). Accordingly, the beam-based pre-distortion training may enable reduced error vector magnitude(s) and/or improved signal quality, for example, due to beam specific distortion compensation being applied to transmissions via one or more beams.

At 414, the first wireless device 402*a* may send, to the controller 404, one or more second calibration signals via a beam (which may be different from the training beam(s) used at 408) using the parameter(s) obtained at 412. The controller 404 may evaluate the performance of communications via the beam using the parameter(s). When the performance does not satisfy a threshold (e.g., when the EVM associated with the beam is greater than or equal to a threshold), the controller 404 may notify the first wireless device to perform beam-based pre-distortion training for a second set of beams (e.g., the second beam 312*b*). For example, the process flow may repeat the signaling and/or operations of 406 through 414 to determine calibration parameter(s) for one or more beams. Note that the beam-based pre-distortion training described herein (such as the signaling and/or operations described herein with respect to 406 through 414) may be performed as a part of a manufacturing process (e.g., a method of manufacture) to calibrate a wireless communications device before being deployed.

At 416, the first wireless device 402*a* sends, to the second wireless device 402*b*, signal(s) via one or more beam(s) with (digital) pre-distortion according to the parameter(s)

obtained at 412. As an example, the first wireless device 402*a* may send, to the second wireless device 402*b*, the signal(s) via the first beam 312*a* with DPD according to the parameter(s) obtained at 412.

Note that the process flow illustrated in FIG. 4 is described herein to facilitate an understanding of beam-based pre-distortion training, and aspects of the present disclosure may be performed in various manners via alternative or additional signaling and/or operations. In certain aspects, the operations and/or signaling of FIG. 4 may occur in an order different from that described or depicted, and various actions, operations, and/or signaling may be added, omitted, or combined.

Figure 5:
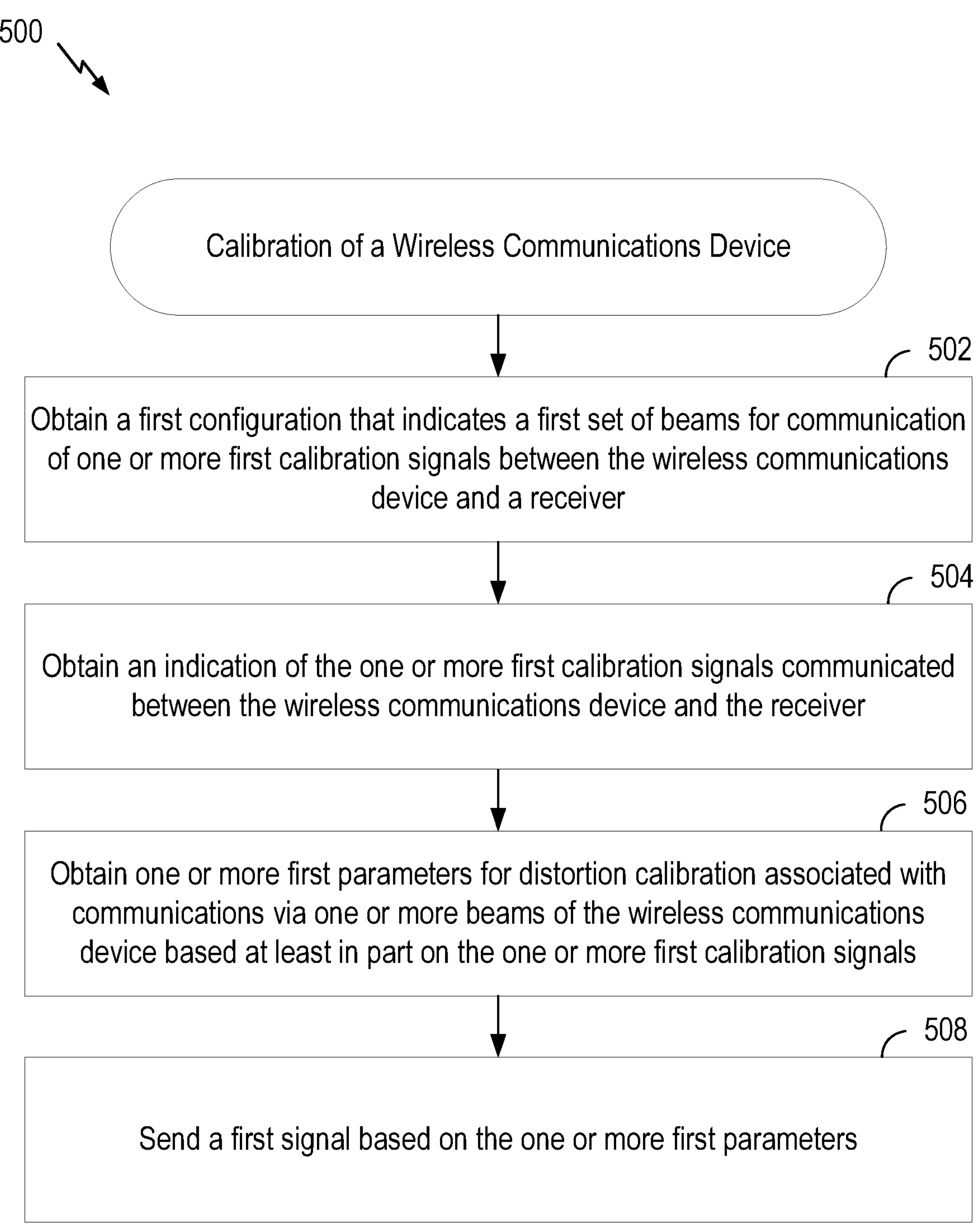
FIG. 5 depicts an example method for calibration of a wireless communications device.

FIG. 5 illustrates example operations 500 for calibration of a wireless communications device (hereinafter "the wireless device"). The operations 500 may be performed, for example, by a wireless device (e.g., the wireless device 302 of FIG. 3) and/or a controller (e.g., the controller 306 of FIG. 3). The operations 500 may be implemented as software components that are executed and run on one or more processors (e.g., the modem 210 and/or the processor 212 of FIG. 2). Further, the transmission and/or reception of signals by the wireless device in the operations 500 may be enabled, for example, by one or more antennas (e.g., the antenna 220 of FIG. 2). In certain aspects, the transmission and/or reception of signals by the wireless device may be implemented via a bus interface of one or more processors (e.g., the modem 210 and/or the processor 212 of FIG. 2) obtaining and/or outputting signals for reception or transmission.

The operations 500 may optionally begin, at block 502, where the wireless device and/or the controller may obtain a first configuration that indicates a first set of beams for communication of one or more first calibration signals between the wireless device and a receiver, for example, as described herein with respect to FIGS. 3 and 4. In certain aspects, the first set of beams comprises at least one beam of the one or more beams. In certain aspects, the first set of beams comprises a plurality of beams of the one or more beams. In certain aspects, the controller may determine the first configuration for the wireless device, and the controller may send the first configuration to the wireless device.

At block 504, the wireless device and/or the controller may obtain an indication of the one or more first calibration signals communicated between the wireless device and the receiver.

At block 506, the wireless device and/or the controller may obtain one or more first parameters for distortion calibration associated with communications via one or more beams of the wireless communications device based at least in part on the one or more first calibration signals.

At block 508, the wireless device and/or the controller may send a first signal based on the one or more first parameters. In certain aspects, sending the first signal based on the one or more first parameters comprises sending, via the wireless device, the first signal with digital pre-distortion according to the one or more first parameters. In certain aspects, sending the first signal based on the one or more first parameters comprises sending, to the wireless device, the first signal indicating the one or more first parameters. For example, the wireless device may transmit the first signal to another wireless communications device (e.g., any of the second wireless devices 104 depicted in FIG. 1). The first signal may indicate (or carry) any of various information, such as data and/or control information. In some cases, the first signal may indicate (or carry) one or more packets or data blocks.

In certain aspects, the first configuration further indicates a beam sweeping pattern over time across the first set of beams for communication of the one or more first calibration signals.

In certain aspects, the operations 500 may include obtaining a second configuration that indicates a second set of beams for communication of one or more second calibration signals between the wireless device and the receiver, wherein the first set of beams comprises a first beam, and the second set of beams comprises a second beam that is different from the first beam; obtaining an indication of the one or more second calibration signals communicated between the wireless device and the receiver; obtaining one or more second parameters for distortion calibration associated with communications via at least the second beam of the wireless device based at least in part on the one or more second calibration signals; and sending a second signal based on the one or more second parameters. In certain aspects, obtaining the second configuration comprises determining the second configuration in response to a performance of communications, via the second beam in accordance with the one or more first parameters, not satisfying a threshold (e.g., when the EVM associated with the second beam is greater than or equal to the threshold).

In certain aspects, one or more metrics associated with the one or more first calibration signals at the receiver satisfy one or more thresholds. In certain aspects, the one or more thresholds comprise one or more of: a SNR threshold; an integrated phase noise threshold; or a residual sideband power threshold.

In certain aspects, obtaining the one or more first parameters comprises determining the one or more first parameters for the distortion calibration based at least in part on a comparison between the one or more first calibration signals and one or more signals (e.g., feedback signals) obtained at the receiver, the one or more signals corresponding to the one or more first calibration signals.

In certain aspects, one or more first pre-distortion coefficients associated with communications via a first beam of the one or more beams; one or more second pre-distortion coefficients associated with communications via a second beam of the one or more beams; or one or more third pre-distortion coefficients associated with communications via a plurality of beams of the one or more beams.

Various components of the wireless device, the controller, and/or receiver may provide means for performing the operations 500 described with respect to FIG. 5, or any aspect related to operations described herein. For example, means for transmitting, sending, or outputting may include the TX path 218 and/or antenna(s) 220 of the first wireless device 102 illustrated in FIG. 2, the antenna array 308 of the wireless device 302 depicted in FIG. 3, the modem 210 and/or processor 212 depicted in FIG. 2, and/or the processor 316 in FIG. 3. Means for receiving or obtaining may include the RX path 222 and/or antenna(s) 220 of the first wireless device illustrated in FIG. 2, the receiver 304 of FIG. 3, the modem 210 and/or processor 212 depicted in FIG. 2, and/or the processor 316 in FIG. 3. Means for determining may include one or more processors, such as the modem 210 and/or processor 212 depicted in FIG. 2 and/or the processor 316 in FIG. 3.

Example Aspects

Implementation examples are described in the following numbered clauses:

Aspect 1: An apparatus configured for calibration of a wireless communications device, comprising: one or more memories; and one or more processors coupled to the one or more memories, the one or more processors being configured to cause the apparatus to: obtain a first configuration that indicates a first set of beams for communication of one or more first calibration signals between the wireless communications device and a receiver; obtain an indication of the one or more first calibration signals communicated between the wireless communications device and the receiver; obtain one or more first parameters for distortion calibration associated with communications via one or more beams of the wireless communications device based at least in part on the one or more first calibration signals; and send a first signal based on the one or more first parameters.

Aspect 2: The apparatus of Aspect 1, wherein the first set of beams comprises at least one beam of the one or more beams.

Aspect 3: The apparatus of Aspect 1 or 2, wherein the first set of beams comprises a plurality of beams of the one or more beams.

Aspect 4: The apparatus according to any of Aspects 1-3, wherein the first configuration further indicates a beam sweeping pattern over time across the first set of beams for communication of the one or more first calibration signals.

Aspect 5: The apparatus according to any of Aspects 1-4, wherein the one or more processors are configured to cause the apparatus to: obtain a second configuration that indicates a second set of beams for communication of one or more second calibration signals between the wireless communications device and the receiver, wherein the first set of beams comprises a first beam, and the second set of beams comprises a second beam that is different from the first beam; obtain an indication of the one or more second calibration signals communicated between the wireless communications device and the receiver; obtain one or more second parameters for distortion calibration associated with communications via at least the second beam of the wireless communications device based at least in part on the one or more second calibration signals; and send a second signal based on the one or more second parameters.

Aspect 6: The apparatus according to Aspect 5, wherein to obtain the second configuration, the one or more processors are configured to cause the apparatus to determine the second configuration in response to a performance of communications, via the second beam in accordance with the one or more first parameters, not satisfying a threshold.

Aspect 7: The apparatus according to any of Aspects 1-6, wherein one or more metrics associated with the one or more first calibration signals at the receiver satisfy one or more thresholds.

Aspect 8: The apparatus according to Aspect 5, wherein the one or more thresholds comprise one or more of: a signal-to-noise ratio (SNR) threshold; an integrated phase noise threshold; or a residual sideband power threshold.

Aspect 9: The apparatus according to any of Aspects 1-8, wherein to obtain the one or more first parameters, the one or more processors are configured to cause the apparatus to determine the one or more first parameters for the distortion calibration based at least in part on a comparison between the one or more first calibration signals and one or more signals obtained at the receiver, the one or more signals corresponding to the one or more first calibration signals.

Aspect 10: The apparatus according to any of Aspects 1-9, wherein the one or more first parameters comprises one or more of: one or more first pre-distortion coefficients associated with communications via a first beam of the one or more beams; one or more second pre-distortion coefficients associated with communications via a second beam of the one or more beams; or one or more third pre-distortion coefficients associated with communications via a plurality of beams of the one or more beams.

Aspect 11: The apparatus according to any of Aspects 1-10, wherein the one or more processors are configured to cause the apparatus to send, to the wireless communications device, the first configuration.

Aspect 12: The apparatus according to any of Aspects 1-11, wherein to send the first signal based on the one or more first parameters, the one or more processors are configured to cause the apparatus to send the first signal with digital pre-distortion according to the one or more first parameters.

Aspect 13: The apparatus according to any of Aspects 1-12, wherein to send the first signal based on the one or more first parameters, the one or more processors are configured to cause the apparatus to send, to the wireless communications device, the first signal indicating the one or more first parameters.

Aspect 14: A method for calibration of a wireless communications device, comprising: obtaining a first configuration that indicates a first set of beams for communication of one or more first calibration signals between the wireless communications device and a receiver; obtaining an indication of the one or more first calibration signals communicated between the wireless communications device and the receiver; obtaining one or more first parameters for distortion calibration associated with communications via one or more beams of the wireless communications device based at least in part on the one or more first calibration signals; and sending a first signal based on the one or more first parameters.

Aspect 15: The method according to Aspect 14, wherein the first set of beams comprises at least one beam of the one or more beams.

Aspect 16: The method according to any of Aspects 14-15, wherein the first set of beams comprises a plurality of beams of the one or more beams.

Aspect 17: The method according to any of Aspects 14-16, wherein the first configuration further indicates a beam sweeping pattern over time across the first set of beams for communication of the one or more first calibration signals.

Aspect 18: The method according to any of Aspects 14-17, further comprising: obtaining a second configuration that indicates a second set of beams for communication of one or more second calibration signals between the wireless communications device and the receiver, wherein the first set of beams comprises a first beam, and the second set of beams comprises a second beam that is different from the first beam; obtaining an indication of the one or more second calibration signals communicated between the wireless communications device and the receiver; obtaining one or more second parameters for distortion calibration associated with communications via at least the second beam of the wireless communications device based at least in part on the one or more second calibration signals; and sending a second signal based on the one or more second parameters.

Aspect 19: The method according to Aspect 18, wherein obtaining the second configuration comprises determining the second configuration in response to a performance of communications, via the second beam in accordance with the one or more first parameters, not satisfying a threshold.

Aspect 20: The method according to any of Aspects 14-19, wherein one or more metrics associated with the one or more first calibration signals at the receiver satisfy one or more thresholds.

Aspect 21: The method according to Aspect 20, wherein the one or more thresholds comprise one or more of: a signal-to-noise ratio (SNR) threshold; an integrated phase noise threshold; or a residual sideband power threshold.

Aspect 22: The method according to any of Aspects 14-21, wherein obtaining the one or more first parameters comprises determining the one or more first parameters for the distortion calibration based at least in part on a comparison between the one or more first calibration signals and one or more signals obtained at the receiver, the one or more signals corresponding to the one or more first calibration signals.

Aspect 23: The method according to any of Aspects 14-22, wherein the one or more first parameters comprises one or more of: one or more first pre-distortion coefficients associated with communications via a first beam of the one or more beams; one or more second pre-distortion coefficients associated with communications via a second beam of the one or more beams; or one or more third pre-distortion coefficients associated with communications via a plurality of beams of the one or more beams.

Aspect 24: The method according to any of Aspects 14-23, further comprising sending, to the wireless communications device, the first configuration.

Aspect 25: The method according to any of Aspects 14-24, wherein sending the first signal based on the one or more first parameters comprises sending the first signal with digital pre-distortion according to the one or more first parameters.

Aspect 26: The method according to any of Aspects 14-25, wherein sending the first signal based on the one or more first parameters comprises sending, to the wireless communications device, the first signal indicating the one or more first parameters.

Aspect 27: An apparatus, comprising: a memory; and one or more processors configured to perform a method in accordance with any of Aspects 14-26.

Aspect 28: An apparatus, comprising means for performing a method in accordance with any of Aspects 14-26.

Aspect 29: A non-transitory computer-readable medium comprising computer-executable instructions that, when executed by one or more processors of a processing system, cause the processing system to perform a method in accordance with any of Aspects 14-26.

Aspect 30: A computer program product embodied on a computer-readable storage medium comprising code for performing a method in accordance with any of Aspects 14-26.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a microcontroller, a microprocessor, a general-purpose processor, a digital signal processor (DSP), an artificial intelligence (AI) processor, an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, identifying, mapping, applying, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." The use of a definite article (e.g., "the" or "said") before an element is not intended to impart a singular meaning (e.g., "one and only one") on an otherwise plural meaning (e.g., "one or more") associated with the element unless specifically so stated. Unless specifically stated otherwise, the term "some" refers to one or more. No claim element is to be construed under the provisions of 35 U.S.C. § 112(f) unless the element is expressly recited using the phrase "means for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus configured for calibration of a wireless communications device, comprising:

one or more memories; and one or more processors coupled to the one or more memories, the one or more processors being configured to cause the apparatus to:

obtain a first configuration that indicates a first set of beams for communication of at least one or more first calibration signals, via a first beam of the first set of beams, between the wireless communications device and a receiver;

obtain an indication of the one or more first calibration signals communicated, via the first beam, between the wireless communications device and the receiver;

obtain one or more first parameters for distortion calibration associated with communications via one or more beams of the wireless communications device based at least in part on the one or more first calibration signals communicated via the first beam, wherein the one or more first parameters comprise one or more first pre-distortion coefficients associated with communications via a second beam of the one or more beams, wherein the first beam is different from the second beam; and send a first signal, via the second beam, based on the one or more first parameters.

2. The apparatus of claim 1, wherein the first set of beams comprises at least one beam of the one or more beams.

3. The apparatus of claim 1, wherein the first set of beams comprises a plurality of beams of the one or more beams.

4. The apparatus of claim 1, wherein the first configuration further indicates a beam sweeping pattern over time across the first set of beams for communication of one or more second calibration signals including the one or more first calibration signals.

5. The apparatus of claim 1, wherein the one or more processors are configured to cause the apparatus to:

obtain a second configuration that indicates a second set of beams for communication of one or more second calibration signals between the wireless communications device and the receiver, wherein the second set of beams comprises the second beam;

obtain an indication of the one or more second calibration signals communicated between the wireless communications device and the receiver;

obtain one or more second parameters for distortion calibration associated with communications via at least the second beam of the wireless communications device based at least in part on the one or more second calibration signals; and send a second signal based on the one or more second parameters.

6. The apparatus of claim 5, wherein to obtain the second configuration, the one or more processors are configured to cause the apparatus to determine the second configuration in response to a performance of communications, via the second beam in accordance with the one or more first parameters, not satisfying a threshold.

7. The apparatus of claim 1, wherein one or more metrics associated with the one or more first calibration signals at the receiver satisfy one or more thresholds.

8. The apparatus of claim 7, wherein the one or more thresholds comprise one or more of:

a signal-to-noise ratio (SNR) threshold;

an integrated phase noise threshold; or a residual sideband power threshold.

9. The apparatus of claim 1, wherein to obtain the one or more first parameters, the one or more processors are configured to cause the apparatus to determine the one or more first parameters for the distortion calibration based at least in part on a comparison between the one or more first calibration signals and one or more signals obtained at the receiver, the one or more signals corresponding to the one or more first calibration signals.

10. The apparatus of claim 1, wherein the one or more first parameters comprises one or more of:

one or more second pre-distortion coefficients associated with communications via the first beam; or one or more third pre-distortion coefficients associated with communications via a plurality of beams of the one or more beams.

11. The apparatus of claim 1, wherein the one or more processors are configured to cause the apparatus to send, to the wireless communications device, the first configuration.

12. The apparatus of claim 1, wherein to send the first signal based on the one or more first parameters, the one or more processors are configured to cause the apparatus to send the first signal with digital pre-distortion according to the one or more first parameters.

13. The apparatus of claim 1, wherein to send the first signal based on the one or more first parameters, the one or more processors are configured to cause the apparatus to send, to the wireless communications device, the first signal indicating the one or more first parameters.

14. A method for calibration of a wireless communications device, comprising:

obtaining a first configuration that indicates a first set of beams for communication of at least one or more first calibration signals, via a first beam of the first set of beams, between the wireless communications device and a receiver;

obtaining an indication of the one or more first calibration signals communicated, via the first beam, between the wireless communications device and the receiver;

obtaining one or more first parameters for distortion calibration associated with communications via one or more beams of the wireless communications device based at least in part on the one or more first calibration signals communicated via the first beam, wherein the one or more first parameters comprise one or more first pre-distortion coefficients associated with communications via a second beam of the one or more beams, wherein the first beam is different from the second beam; and sending a first signal, via the second beam, based on the one or more first parameters.

15. The method of claim 14, wherein the first set of beams comprises at least one beam of the one or more beams.

16. The method of claim 14, wherein the first set of beams comprises a plurality of beams of the one or more beams.

17. The method of claim 14, wherein one or more metrics associated with the one or more first calibration signals at the receiver satisfy one or more thresholds.

18. The method of claim 14, further comprising sending, to the wireless communications device, the first configuration.

19. The method of claim 14, wherein sending the first signal based on the one or more first parameters comprises sending the first signal with digital pre-distortion according to the one or more first parameters.

20. The method of claim 14, wherein sending the first signal based on the one or more first parameters comprises sending, to the wireless communications device, the first signal indicating the one or more first parameters.

* * * * *